(12) United States Patent
Bae et al.

(10) Patent No.: US 9,036,689 B2
(45) Date of Patent: May 19, 2015

(54) VARIABLE-PRECISION DISTRIBUTED ARITHMETIC MULTI-INPUT MULTI-OUTPUT EQUALIZER FOR POWER-AND-AREA-EFFICIENT OPTICAL DUAL-POLARIZATION QUADRATURE PHASE-SHIFT-KEYING SYSTEM

(71) Applicant: Korea Advanced Institute of Science and Technology, Daejeon (KR)

(72) Inventors: Hyeon Min Bae, Seoul (KR); Soon Won Kwon, Daejeon (KR)

(73) Assignee: TeraSquare Co., Ltd., Seoul (KR)

( * ) Notice: Subject to any disclaimer, the term of this patent is extended or adjusted under 35 U.S.C. 154(b) by 0 days.

(21) Appl. No.: 13/740,118

(22) Filed: Jan. 11, 2013

(65) Prior Publication Data
US 2013/0259112 A1    Oct. 3, 2013

Related U.S. Application Data

(60) Provisional application No. 61/617,229, filed on Mar. 29, 2012.

(51) Int. Cl.
*H03H 7/30* (2006.01)
*H04L 25/03* (2006.01)

(52) U.S. Cl.
CPC .... *H04L 25/03891* (2013.01); *H04L 25/03961* (2013.01); *H04L 2025/03407* (2013.01)

(58) Field of Classification Search
CPC .............. H04B 10/66; H04L 25/03038; H04L 25/03057
See application file for complete search history.

(56) References Cited

U.S. PATENT DOCUMENTS

| 6,115,419    | A  * | 9/2000  | Meehan     | 375/233 |
|--------------|------|---------|------------|---------|
| 2003/0035236 | A1 * | 2/2003  | Satoh et al. | 360/65 |
| 2003/0208516 | A1 * | 11/2003 | Ao et al.  | 708/250 |
| 2005/0271135 | A1 * | 12/2005 | Shida      | 375/232 |
| 2006/0256892 | A1 * | 11/2006 | Momtaz     | 375/317 |
| 2007/0116162 | A1 * | 5/2007  | Eliaz et al. | 375/350 |

* cited by examiner

*Primary Examiner* — Leon-Viet Nguyen
(74) *Attorney, Agent, or Firm* — Blakely, Sokoloff, Taylor & Zafman LLP

(57) ABSTRACT

A variable-precision distributed arithmetic (VPDA) multi-input multi-output (MIMO) equalizer is presented to reduce the size and dynamic power of 112 Gbps dual-polarization quadrature phase-shift-keying (DP-QPSK) coherent optical communication receivers. The VPDA MIMO equalizer compensates for channel dispersion as well as various non-idealities of a time-interleaved successive approximation register (SAR) based analog-to-digital converter (ADC) simultaneously by using a least mean square (LMS) algorithm. As a result, area-hungry analog domain calibration circuits are not required. In addition, the VPDA MIMO equalizer achieves 45% dynamic power reduction over conventional finite impulse response (FIR) equalizers by utilizing the minimum required resolution for the equalization of each dispersed symbol.

16 Claims, 17 Drawing Sheets

VARIABLE-PRECISION DISTRIBUTED ARITHMETIC MULTI-INPUT MULTI-OUTPUT EQUALIZER FOR POWER-AND-AREA-EFFICIENT OPTICAL DUAL-POLARIZATION QUADRATURE PHASE-SHIFT-KEYING SYSTEM

CROSS-REFERENCE TO RELATED APPLICATION

The present application is a U.S. nonprovisional application that claims priority to U.S. provisional application No. 61/617,229, filed Mar. 29, 2012, which is hereby incorporated by reference.

BACKGROUND OF THE INVENTION

1. Field of the Invention

Exemplary embodiments of the present invention relate to a variable-precision distributed arithmetic (VPDA) multi-input multi-output (MIMO) equalizer for power- and area-efficient 112 Gb/s optical dual-polarization quadrature phase-shift-keying (DP-QPSK) system.

2. Discussion of the Background

Coherent optical dual-polarization quadrature phase-shift-keying (DP-QPSK) systems with electrical domain dispersion compensation at a wavelength of 1550 nm are being adapted for 112 Gb/s long-haul optical communication links in order to combat chromatic dispersion (CD). FIG. 1 shows a typical block diagram of a 11-Gb/s DP-QPSK coherent optical receiver. The phase information of the received optical signal is converted to two pairs of analog voltage signals and 2× oversampled using four 56 GS/s analog-to-digital converters (ADCs). A digital equalizer subsequent to the ADCs compensates for the channel dispersion. Such a high data rate requires a massive parallelization in the ADC and digital equalizer due to the bandwidth limitation of active components. The tight performance requirements of the ADC necessitates complex and area-hungry calibration circuits to overcome various non idealities caused by mismatch among parallel ADCs and nonlinearities in each ADC. The power consumption of the digital equalizer increases in proportion to its dispersion compensation capability and the level of computational precision. The power and area of the conventional coherent DP-QPSK system have been the major impediments to its adaptation to high-volume applications such as Metro dense wavelength division multiplexing (DWDM) despite its excellent dispersion compensation capability.

SUMMARY OF THE INVENTION

An exemplary embodiment of the present invention discloses a variable-precision distributed arithmetic (VPDA) multi-input multi-output (MIMO) equalizer connected to outputs of a plurality of analog-to-digital converters (ADCs) based on time-interleaved successive approximation registers, the VPDA MIMO equalizer comprises a plurality of sub-equalizers classified into a first sub-equalizers group and a second sub-equalizers group, wherein each of sub-equalizers included in the first sub-equalizers group is connected to outputs of a first ADC group and each of sub-equalizers included in the second sub-equalizers group is connected to outputs of a second ADC group, and a decision unit configured to determine output signals using outputs of the plurality of sub-equalizers, wherein one sub-equalizer included in the first sub-equalizers group relates to other one sub-equalizer included in the second sub-equalizers group, and one output signal among the output signals is determined by the decision unit based on outputs of the one sub-equalizer and the other one sub-equalizer.

Each of the plurality of sub-equalizers comprises a plurality of additional-equalizers for distributed arithmetic, and each additional-equalizers corresponds to one of bits according to a resolution of the ADCs.

One additional-equalizer of the one sub-equalizer relates to other one additional-equalizer of the other one sub-equalizer, and the one output signal is determined by the decision unit based on an output of the one additional-equalizer and an output of the other one additional-equalizer.

Outputs of the ADCs corresponding to i-th bit of the bits is inputted to i-th additional-equalizers of the plurality of sub-equalizers.

Each of the plurality of additional-equalizers comprises a plurality of finite impulse responses (FIR) filters.

One part of the plurality of FIR filters is connected to outputs of one ADC of the first ADC group (or the second ADC group), and another part of the plurality of FIR filters is connected to outputs of other one ADC of the first ADC group (or the second ADC group).

The plurality of additional-equalizers configured to computing outputs according to a sequence from the most significant bit (MSB) of the bits towards the least significant bit (LSB) of the bits.

The VPDA MIMO equalizer further comprises a range checker configured to determine whether further computing outputs for next bit of the sequence is required based on a equalized symbol determined by outputs for present bit and a decision threshold.

Coefficients with each of bits according to a resolution of the ADCs are combined with filter coefficients of FIR filters by at least one of a distributed arithmetic (DA) scheme and a least mean square (LMS) algorithm.

Each of outputs of the ADCs is multiplied with the combined coefficients and each of outputs of the FIR filters is combined.

An exemplary embodiment of the present invention discloses a dual-polarization quadrature phase-shift-keying (DP-QPSK) receiver comprises a plurality of analog-to-digital converters (ADCs) based on time-interleaved successive approximation registers, a variable-precision distributed arithmetic (VPDA) multi-input multi-output (MIMO) equalizer connected to outputs of the ADCs, wherein the VPDA MIMO equalizer comprises a plurality of sub-equalizers, and each of sub-equalizers comprises a plurality of additional-equalizers and a decision unit configured to determine output signals using outputs of the additional-equalizers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
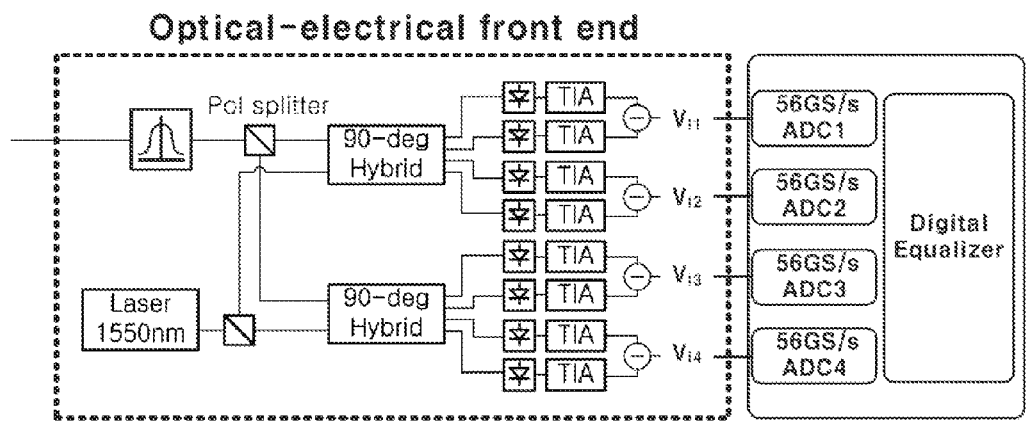
FIG. 1 shows a typical block diagram of a 112 Gbps DP-QPSK coherent optical receiver.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

I. Introduction

In this paper, we propose a power-and-area-efficient variable-precision distributed arithmetic (VPDA) multi-input multi-output (MIMO) equalizer for coherent optical dual-polarization quadrature phase-shift-keying (DP-QPSK) systems suitable for Metro dense wavelength division multiplexing (DWDM) applications which require performance, low power and miniaturization. For example, the target distance may be 80 km. Significant reduction in power and area is achieved on the basis of the following two factors: (i) digital equalizer in this proposed design compensates for the channel dispersion as well as the non-idealities of the analog-to-digital converter (ADC) without hardware overhead, which does not necessitate area-hungry analog domain calibration circuits, and (ii) each dispersed symbol is equalized with the minimum required resolution. The latter factor leads to dynamic power reduction of 45% in the digital equalizer. Section II depicts the proposed receiver architecture and Section III describes the distributed arithmetic (DA) MIMO channel equalizer architecture which also compensates for various mismatches and non-linearities of the successive approximation register (SAR) ADC. Then, section IV describes the variable-precision concept applied to the DA MIMO architecture for the dynamic power reduction. Section V provides the simulation results of the VPDA MIMO equalizer and finally, section VI summarizes the discussion.

II. Receiver Architecture

Figure 2:
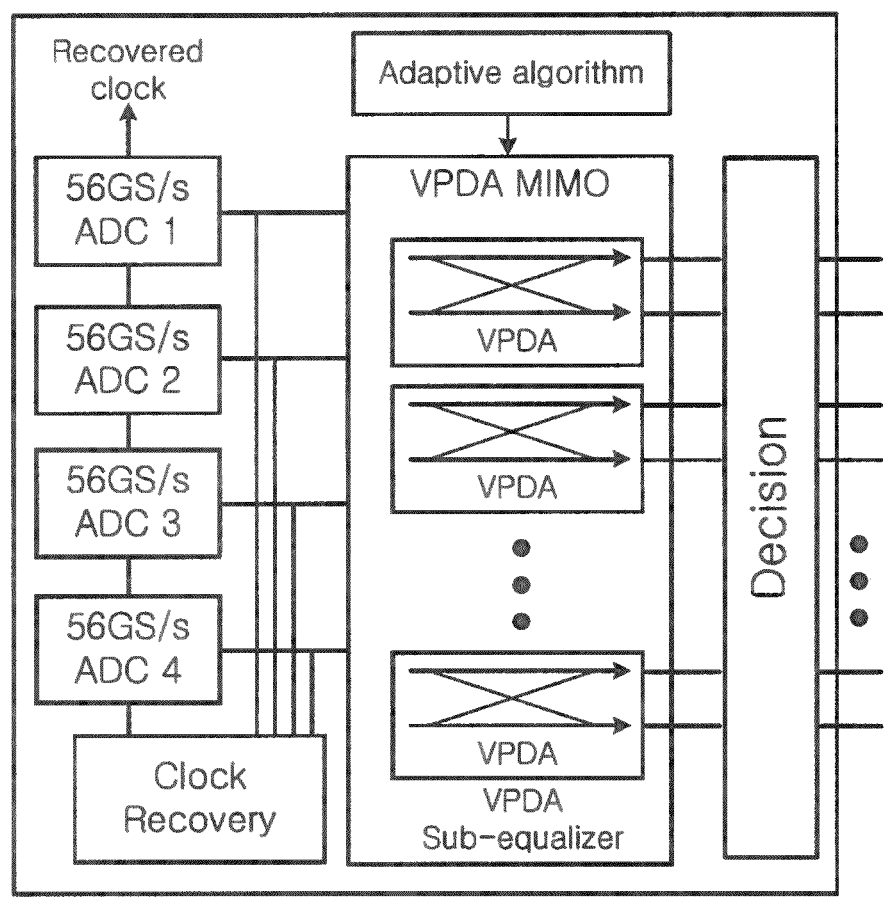
FIG. 2 shows the block diagram of the proposed coherent DP-QPSK receiver for 80 km metro DWDM applications according to an exemplary embodiment of the present invention.

FIG. 2 shows the block diagram of the proposed coherent DP-QPSK receiver for 80 km metro DAVDM applications according to an exemplary embodiment of the present invention. The outputs of four 56 GS/s 5 bit ADCs are connected to both the VPDA MIMO equalizer and a clock recovery block. Conventional dispersion-tolerant phase detectors typically operate under residual CD in long-haul coherent systems can be utilized in this case without pre-equalization because the target distance is only 80 km. In addition, because the phase detector detects the symbol rate directly from 2× oversampled ADC outputs without any assistant from the equalizer, typical start-up issue does not exist.

The VPDA MIMO equalizer is intentionally designed to operate in time domain because the frequency domain counterparts have higher level of complexity in 80 km metro applications where the chromatic dispersion is less than 1280 ps/nm.

III. Compensation of ADC Non-Ideality

Digital signal processing methods to overcome either the mismatch or nonlinearity have been reported. The proposed DA MIMO architecture integrates these two methods together with the channel equalizer without hardware overhead over conventional finite impulse response (FIR) channel equalizers employed in 112 Gb/s coherent optical DP-QPSK systems.

A. Mismatch Compensation

Figure 3:
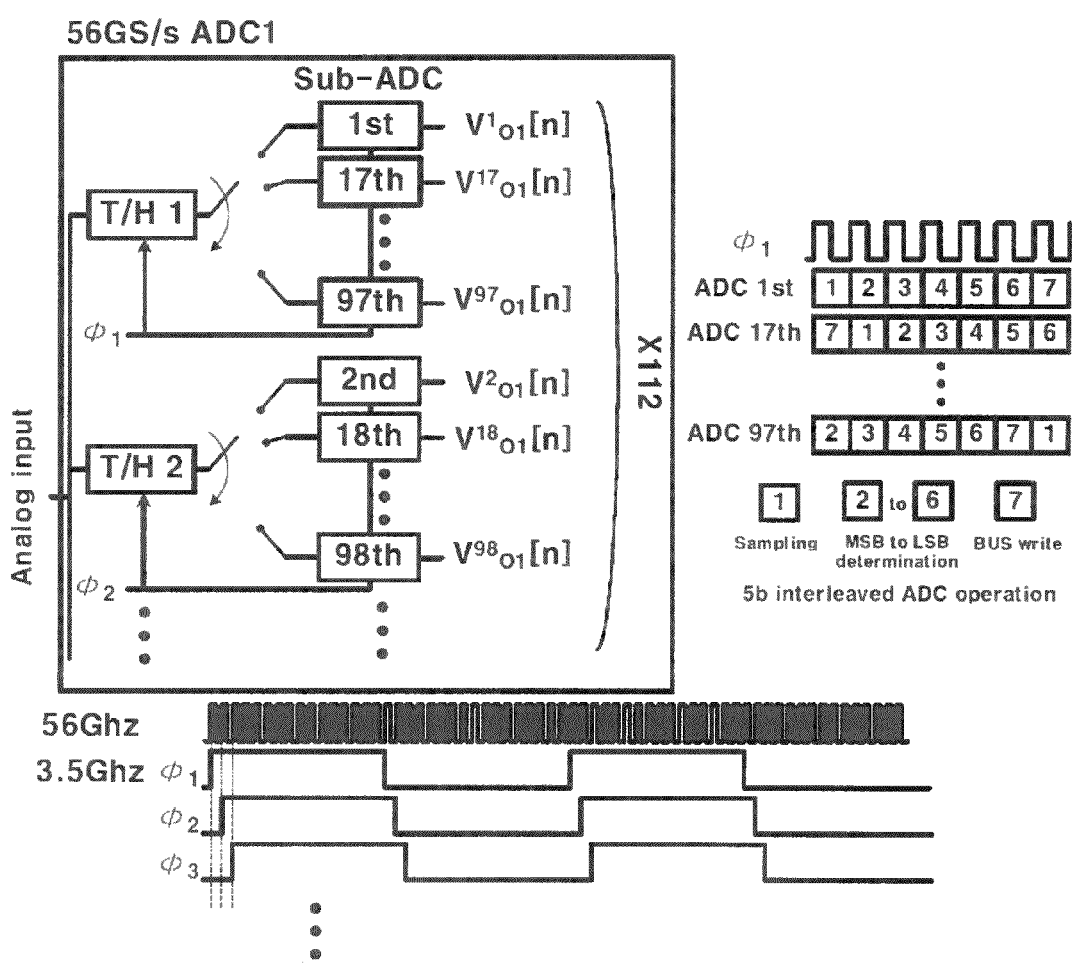
FIG. 3 shows a conceptual block diagram of a 56 GS/s time-interleaved SAR-based ADC according to an exemplary embodiment of the present invention.

It has been shown that the MIMO equalization method can compensate for the offset, gain and sampling time mismatches of a time-interleaved parallel ADC. FIG. 3 shows a conceptual block diagram of a 56 GS/s time-interleaved SAR-based ADC according to an exemplary embodiment of the present invention. The resolution of the ADC is set to five bits to suppress the optical signal-to-noise ratio (OSNR) penalty below 0.5 dB at a bit error ratio (BER) of $10^{-3}$. In our ADC model, 16 track-and-hold (T/H) circuits operating at 3.25 GS/s are parallelized for the sampling rate of 56 GS/s. We assumed that the sub ADCs subsequent to the T/H requires seven clock cycles for each data conversion. Thus, a total of 16×7=112 SAR ADCs are parallelized. As a result, the digitized samples show 112 different cyclic characteristics, which can be modeled by a radix-112 system. Let $V_I^i[n]$ denote the i-th input signal in the radix-112 system, then the n-th input matrix $V_I[n]$ of the radix-112 ADC system may be given by the following Equation 1.

$$V_I[n]=[V_I^1[n]V_I^2[n]\ldots V_I^{112}[n]]^T \quad \text{[Equation 1]}$$

Similarly, the n-th output matrix of the ADC may be the following Equation 2.

$$V_O[n]=[V_O^1[n]V_O^2[n]\ldots V_O^{112}[n]]^T \quad \text{[Equation 2]}$$

Various mismatch effects of the ADC can be interpreted using linear MIMO matrices. Let the matrix G, P and O represent the gain, phase and offset mismatches of the time-interleaved ADC, respectively. $V_I$ and $V_O$ satisfy the following Equation 3.

$$[G]_{112\times112}\cdot[P]_{112\times112}\otimes_c[V_I]_{112\times1}+[O]_{112\times1}=[V_O]_{112\times1} \quad \text{[Equation 3]}$$

The mathematic operator $\otimes_c$ denotes the element-by-element convolution. The quantization noise is not considered for simplicity. The gain mismatch G is a diagonal matrix, which is given by the following Equation 4.

$$G_{ij}=\begin{cases} g_i & i=j \\ 0 & i\neq j \end{cases}, i,j=1\ldots 112 \quad \text{[Equation 4]}$$

wherein $g_i$ represents the gain of the i-th ADC. The sampling phase mismatch P can be described using linear interpolation between adjacent samples in $V_I$, as the following Equation 5.

$$P_{112\times112}=\Phi_{112\times112}^{-1}+\Phi_{112\times112}^{0}+\Phi_{112\times112}^{1}\Phi_{i,j}^k[n]=\phi_{i,j,k}\delta[112n+i-j-k],$$
$$i,j=1\ldots 112 \quad \text{[Equation 5]}$$

wherein $\phi_{i,j,k}$ is the phase coefficient for the i-th ADC input and $\delta[n]$ denotes the discrete time delta function. Because the input signal $V_I$ is 2× oversampled, the P matrix models the phase mismatch with sufficient accuracy.

The offset vector O is a 112×1 matrix, as given by the following Equation 6.

$$O=[O^1 O^2 \ldots O^{112}]^T \quad \text{[Equation 6]}$$

Wherein $O^i$ represents the offset of the i-th ADC.

A coherent DP-QPSK receiver requires four 56 GS/s ADCs, as shown in FIG. 1; thus, the total number of sub ADCs is 112×4=448. Let $S_I$ and $S_Q$ be represented by the following Equation 7.

$$S_I=\begin{bmatrix} V_{I1} \\ V_{I3} \end{bmatrix}\cdot S_Q=\begin{bmatrix} V_{I2} \\ V_{I4} \end{bmatrix} \quad \text{[Equation 7]}$$

wherein $S_I$ and $S_Q$ denote the in-phase and quadrature-phase signals in a QPSK system, respectively. Equation 3 can be expanded to include all four ADC inputs $S_I$ and $S_Q$ as the following Equation 8.

$$M_I\otimes_c S_I+j\cdot M_Q\otimes_c S_Q+C=R_I+j\cdot R_Q \quad \text{[Equation 8]}$$

wherein $M_I$ and $M_Q$ may be represented by the following Equation 9. Also, C and $R_I+j\cdot R_Q$ may be represented by the following Equation 10.

$$M_I=\begin{bmatrix} G_1\cdot P_1 & 0 \\ 0 & G_3\cdot P_3 \end{bmatrix}_{224\times224} \quad \text{[Equation 9]}$$

$$M_Q=\begin{bmatrix} G_2\cdot P_2 & 0 \\ 0 & G_4\cdot P_4 \end{bmatrix}_{224\times224}$$

$$C=\begin{bmatrix} O_1 \\ O_3 \end{bmatrix}_{224\times1}+j\cdot\begin{bmatrix} O_2 \\ O_4 \end{bmatrix}_{224\times1}=C_I+j\cdot C_Q \quad \text{[Equation 10]}$$

$$R_I+j\cdot R_Q=\begin{bmatrix} V_{O1} \\ V_{O3} \end{bmatrix}+j\cdot\begin{bmatrix} V_{O2} \\ V_{O4} \end{bmatrix}.$$

Ideal ADC outputs $S_I$ and $S_Q$ can be retrieved as the following Equation 11.

$$S_I+jS_Q=M_I^{-1}\otimes_c R_I+j\cdot M_Q^{-1}\otimes_c R_Q+C' \quad \text{[Equation 11]}$$

wherein C' may be represented by the following Equation 12.

$$C'=-M_I^{-1}\otimes_c C_I-j\cdot M_Q^{-1}\otimes_c C_Q \quad \text{[Equation 12]}$$

Let the 2× oversampled transmitted QPSK signal vectors through X and Y polarizations are $X_{I,Q}$ and $Y_{I,Q}$, respectively. $X_{I,Q}$ and $Y_{I,Q}$ can be written in 112×1 matrix as given by the following Equation 13.

$$X_{I,Q}=[X_{I,Q}^1[n]X_{I,Q}^1[n]X_{I,Q}^2[n]X_{I,Q}^2[n]\ldots X_{I,Q}^{56}[n]]^T$$

$$Y_{I,Q}=[Y_{I,Q}^1[n]Y_{I,Q}^1[n]Y_{I,Q}^2[n]Y_{I,Q}^2[n]\ldots X_{I,Q}^{56}[n]]^T \quad \text{[Equation 13]}$$

wherein $X_{I,Q}^i[n]=X_{I,Q}[56n+i]$ and $Y_{I,Q}^i[n]=y_{I,Q}[56n+i]$. Note that $x_{I,Q}$ and $y_{I,Q}$ denote transmitted symbols. CD in the radix-112 matrix format may be represented by the following Equation 14.

$$CD_{ij}[n]=cd[112n+i-j], i,j=1\ldots 112 \quad \text{[Equation 14]}$$

wherein cd[n] denotes the 2× oversampled complex impulse response of CD.

The first-order polarization mode dispersion (PMD) can also be written as a radix-112 matrix, as the following Equation 15.

$$PMD=\begin{bmatrix} \cos\alpha\times I^{\theta_x} & -\sin\alpha\times I^{\theta_y} \\ \sin\alpha\times I^{\theta_x} & \cos\alpha\times I^{\theta_y} \end{bmatrix} \quad \text{[Equation 15]}$$

$$I_{ij}^{\theta_{x,y}}=\delta[112n+i-j-\theta_{x,y}],$$
$$i,j=1\ldots 112$$

PMD adds a phase delay of _ to each polarization and attenuates the transmitted signal by rotating the polarization angle by α. The combined channel dispersion matrix H including CD and PMD may be represented by the following Equation 16.

$$H_{224\times224}=\begin{bmatrix} [CD]_{112\times112} & 0 \\ 0 & [CD]_{112\times112} \end{bmatrix}\otimes_c[PMD]_{224\times224} \quad \text{[Equation 16]}$$

Let matrix $\hat{D}$ denote the combined transmitted signal as given by the following Equation 17.

$$\hat{D} = \begin{bmatrix} X_I + j \cdot X_Q \\ Y_I + j \cdot Y_Q \end{bmatrix}$$ [Equation 17]

Because the received dispersed signal at the input of the ADC may be related to $\hat{D}$ as the following Equation 18.

$$[\hat{D}]_{224 \times 1} = [H]_{224 \times 224}^{-1} \otimes_c S_I + j \cdot [H]_{224 \times 224}^{-1} \otimes_c S_Q \quad \text{[Equation 18]}$$

the transmitted data matrix $\hat{D}$ can be retrieved from non-ideal outputs of the ADCs by using Equation 11 and Equation 18 as the following Equation 19.

$$\hat{D} = \hat{A} \otimes_c R_I + j \cdot \hat{B} \otimes_c R_Q + \hat{C}'' \quad \text{[Equation 19]}$$

wherein $\hat{A}$ and $\hat{B}$ may be represented by the following Equation 20 and $\hat{C}''$ may be represented by the following Equation 21.

$$\hat{A}_{224 \times 224} = H^{-1} \otimes_c M_I^{-1}, \; \hat{B}_{224 \times 224} = H^{-1} \otimes_c M_Q^{-1} \quad \text{[Equation 20]}$$

$$\hat{C}'' = H^{-1} \otimes_c C' \quad \text{[Equation 21]}$$

However, because the received signal is 2× oversampled, only half of the components in $\hat{D}$ must be equalized. Therefore, D may be represented by the following Equation 22.

$$D = A \otimes_c R_I + j \cdot B \otimes_c R_Q + C'' \quad \text{[Equation 22]}$$

Wherein A and B may be represented by the following Equation 23. Also, D and C'' may be represented by the following Equation 24.

$$A_{112 \times 224} = \begin{bmatrix} \hat{A}_1 \\ \hat{A}_3 \\ \cdots \\ \hat{A}_{223} \end{bmatrix}, \; B_{112 \times 224} = \begin{bmatrix} \hat{B}_1 \\ \hat{B}_3 \\ \cdots \\ \hat{B}_{223} \end{bmatrix} \quad \text{[Equation 23]}$$

$$D_{112 \times 1} = \begin{bmatrix} X_I^1[n] + jX_Q^1[n] \\ \cdots \\ X_I^{56}[n] + jX_Q^{56}[n] \\ Y_I^1[n] + jY_Q^1[n] \\ \cdots \\ Y_I^{56}[n] + jY_Q^{56}[n] \end{bmatrix}, \; C''_{112 \times 1} = \begin{bmatrix} \hat{C}''_1 \\ \hat{C}''_3 \\ \cdots \\ \hat{C}''_{223} \end{bmatrix} \quad \text{[Equation 24]}$$

Equation 22 can be realized with a MIMO equalizer and the mismatches in the parallel ADCs and the channel dispersion can be compensated for simultaneously by adapting the coefficients of A, B, and C'' using a least mean square (LMS) algorithm.

The MIMO equalizer doesn't require a front-end equalizer for the compensation of the gain and phase mismatches of an optical hybrid. It is because the MIMO equalizer can compensate for such non-idealities together with the gain and phase mismatches of an ADC.

Figure 4:
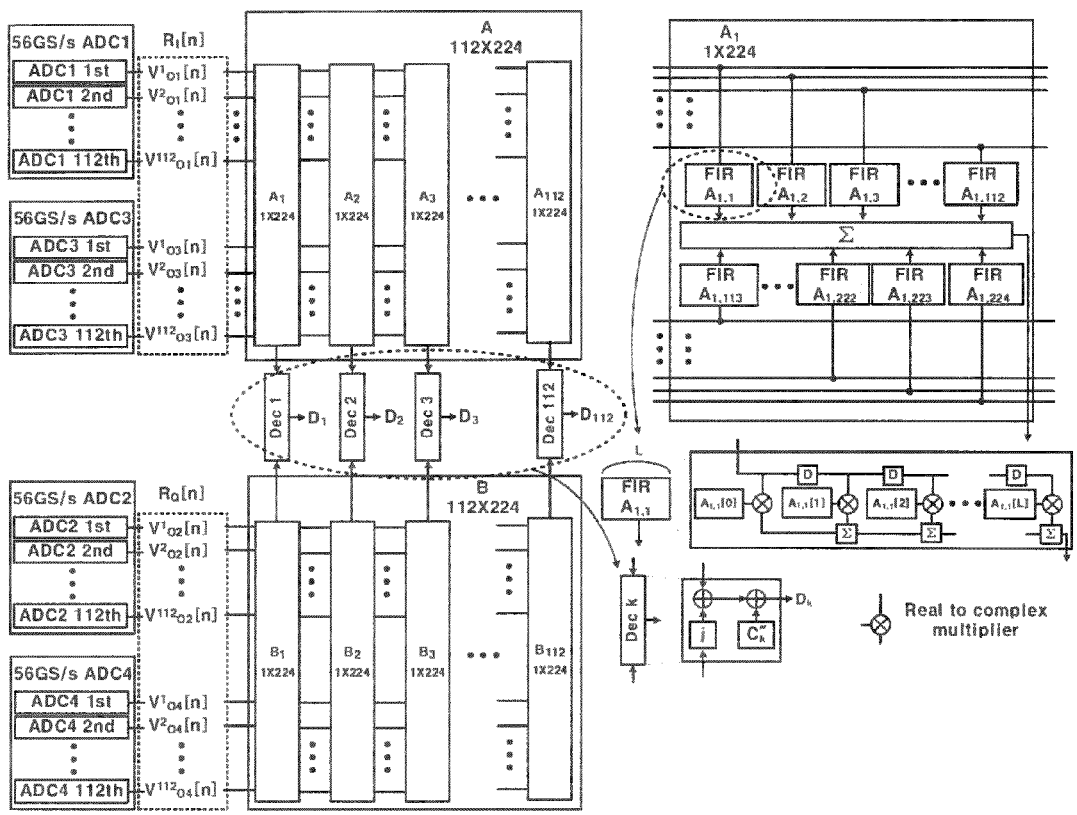
FIG. 4 shows a block diagram of the MEMO equalizer according to an exemplary embodiment of the present invention.

FIG. 4 shows a block diagram of the MIMO equalizer according to an exemplary embodiment of the present invention. $A_1 \sim A_{112}$ denote sub-equalizers and $A_{1,1} \sim A_{1,224}$ denote the coefficients of $A_I$, as given by the following Equation 25.

$$A = \begin{bmatrix} A_1 \\ A_2 \\ \cdots \\ A_{112} \end{bmatrix} \quad \text{[Equation 25]}$$

$$A_1 = [A_{1,1} \; A_{1,2} \; \cdots \; A_{1,224}]$$

Figure 5:
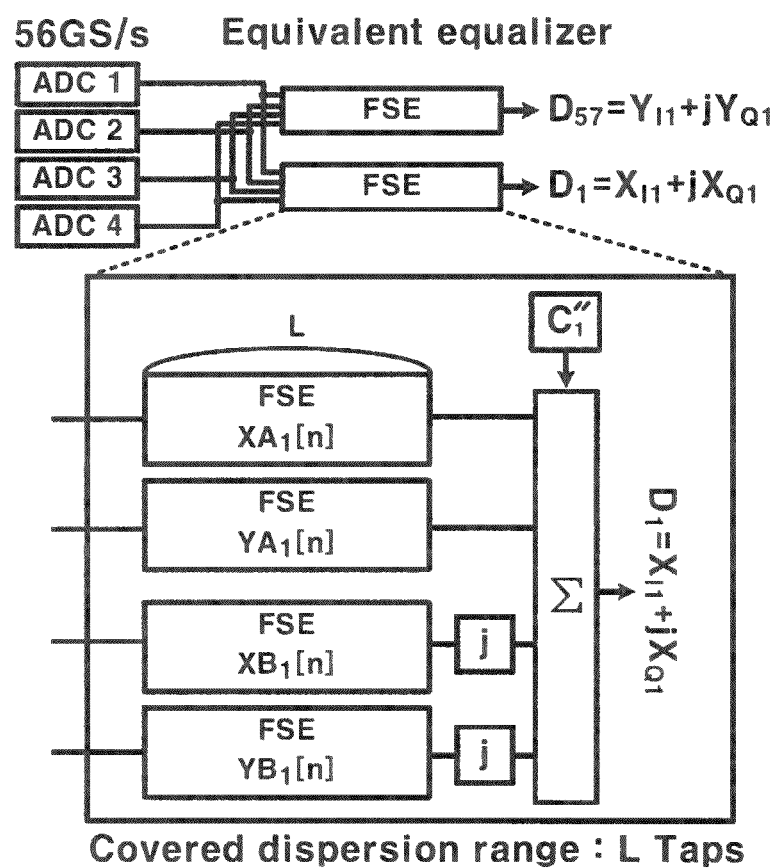
FIG. 5 shows a section of hardware utilized for the equalization of two transmitted symbols through X and Y polarizations according to an exemplary embodiment of the present invention.

FIG. 5 shows a section of hardware utilized for the equalization of two transmitted symbols through X and Y polarizations according to an exemplary embodiment of the present invention. The length of a fractionally spaced sub-equalizer (FSE) is L. The coefficients of the FSE may satisfy the following Equation 26.

$$XA_1[112 \times n + k] = A_{1,k}[n] \, k = 1 \ldots 112,$$

$$YA_1[112 \times n + k - 112] = A_{1,k}[n] \, k = 113 \ldots 224,$$

$$XB_1[112 \times n + k] = B_{1,k}[n] \, k = 1 \ldots 112,$$

$$XB_1[112 \times n + k - 112] = B_{1,k}[n] \, k = 113 \ldots 224.$$

The total number of parallelized sub-equalizers for one polarization is 56, as 112 parallelized ADCs are oversampling the received signal by a factor of 2. The total number of real value multiplications required for the reconstruction of two transmitted symbols $X_{IQ}$ and $X_{IQ}$ in the MIMO equalizer is L×8×2=16×L as shown in the following Table 1 (a). Note that the factor of 2 is multiplied because the filter coefficients are complex numbers.

Figure 6:
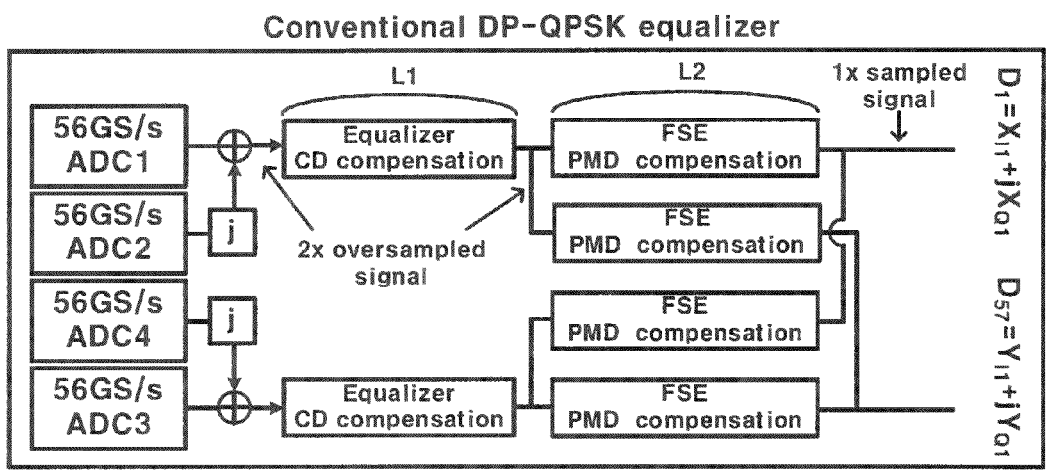
FIG. 6 shows the block diagrams of one sub-equalizer in a conventional parallel FIR equalizer for 112 Gb/s DP-QPSK coherent systems according to an exemplary embodiment of the present invention.

FIG. 6 shows the block diagrams of one sub-equalizer in a conventional parallel FIR equalizer for 112 Gb/s DP-QPSK coherent systems. $L_1$ and $L_2$ denote the length of the HR filter taps required for the compensation of CD and PMD, respectively. $L_1$ and $L_2$ should satisfy $L_1+L_2=L$ given that the dispersion compensation capabilities of conventional and MIMO equalizers are equal. CD and PMD are compensated for separately and each FSE receives complex samples from two ADCs. Because the PMD equalization process is performed sequentially, the CD equalizer should maintain a oversampling ratio to minimize the SNR penalty in the PMD compensator. Note that both filter coefficients and sampled ADC outputs are complex in this case. The total number of real-value multiplications required for the reconstruction of two transmitted symbols $X_{IQ}$ and $Y_{IQ}$ in the conventional equalizer is $(L_1 \times 2 \times 2 + L_2 \times 4) \times 4 = 16 \times (L_1+L_2)$ which is identical to 16×L as shown in the following Table 1 (b). Consequently, the MIMO equalizer has no size penalty in terms of multiplier counts over conventional equalizers and does not require area-hungry ADC calibration circuits.

TABLE 1

|   | length | parallel | real-value multiplier | FSE factor | Total |
|---|---|---|---|---|---|
| (a) | L | 8 | 2 | 1 | 16 × L |
| (b) | $L_1$ | 2 | 4 | 2 | 16 ($L_1 + L_2$) |
|   | $L_2$ | 4 | 4 | 1 |   |

B. ADC Nonlinearity Compensation

SAR ADC is considered as most suitable type for coherent optical communication. It has been shown that the nonlinearity of a SAR ADC can be compensated for using a digital-domain signal processing method. Unlike the previous work which uses a reference ADC for calibration, the proposed DA MIMO equalizer can compensate for the nonlinearity of a SAR ADC and channel dispersion simultaneously by using the estimated output mean square error. Because this compensation process is an interpretation rather than a calibration scheme to deal with the non-linearity, a certain amount of SNR penalty at the final output can exist.

Figure 7:
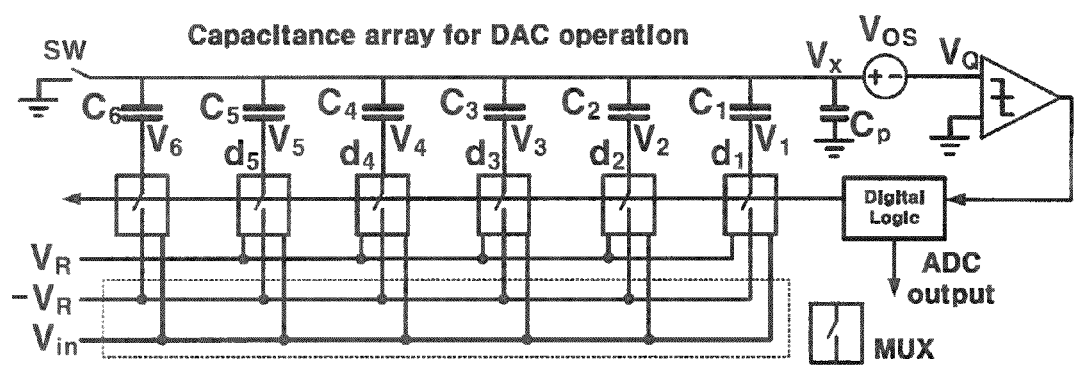
FIG. 7 shows a block diagram of a five-bit switched-capacitor SAR-ADC according to an exemplary embodiment of the present invention.

A SAR ADC may consist of a capacitance array for digital-to-analog conversion (DAC), a comparator for the decision, and a digital logic block for the DAC control. FIG. 7 shows a block diagram of a five-bit switched-capacitor SAR-ADC according to an exemplary embodiment of the present invention. When switch SW is connected during the sampling period, the input signal $V_{in}$ is sampled at the bottom plate of the capacitor array and $V_1 \sim V_6$ become Vin. The switch SW is turned off after the sampling period and $V_1 \sim V_6$ are connected to $V_1 \sim V_6$. The voltage change at $V_x$, defined as $\Delta V_x$, is related to the voltage changes at $V_1 \sim V_6$ as given by the following Equation 27:

$$\frac{\Delta V_x}{\Delta V_i} = \frac{C_i}{C_{tot} + C_p} = K_i \quad i \in \{1 \ldots 6\} \quad \text{[Equation 27]}$$

where $\Delta V_i$ denotes the voltage change at $V_i$, $C_{tot} = \tau_{i=1}^{6} C_i$ and $C_p$ is the parasitic capacitance. The total voltage change $\Delta V_x$ may be represented by the following Equation 28.

$$\Delta V_x = \Sigma_{i=1}^{6} K_i \Delta V_i = \Sigma_{i=1}^{6} K_i (-V_R - V_{in}) \quad \text{[Equation 23]}$$

The capacitor array receives digital codes $d_1 \sim d_5$ from the digital logic block and adds the corresponding analog voltage to the sampled input signal $V_{in}$ using a charge redistribution process. The digital logic block uses a binary search algorithm to find the digital code which takes $V_x$ to the sub-LSB level. $V_x$ is related to the digital code $d_1 \sim d_5$, $V_{in}$ and $V_R$ as given by the following Equation 29.

$$V_x = \sum_{i=1}^{6} K_i(-V_R - V_{in}) + \sum_{i=1}^{5} d_i \cdot 2K_i V_R$$

$$= \sum_{i=1}^{5}(2d_i - 1)K_i V_R - K_0 V_R - K_{tot} V_{in} \quad \text{[Equation 29]}$$

wherein $K_{tot}$ may be represented by the following Equation 30.

$$K_{tot} = \sum_{i=1}^{6} K_i = \frac{C_{tot}}{C_{tot} + C_p} \quad \text{[Equation 30]}$$

Hence, the input signal $V_{in}$ may be represented by the following Equation 31.

$$V_{in} = K_{tot}^{-1}\left(\sum_{i=1}^{5}(2d_i - 1)K_i V_R - K_0 V_R - V_x\right)$$

$$= K_{tot}^{-1}\left(\sum_{i=1}^{5}(2d_i - 1)K_i V_R - K_0 V_R - (V_Q + V_{os})\right) \quad \text{[Equation 31]}$$

wherein $K_{os}$, $V_Q$ are the comparator offset and the quantization noise, respectively. Equation 31 shows that the input signal $V_{in}$ can be accurately reconstructed from digital codes $d_1 \sim d_5$ by multiplying adequate coefficients with each bit and adding a proper offset in a SAR ADC.

Figure 8:
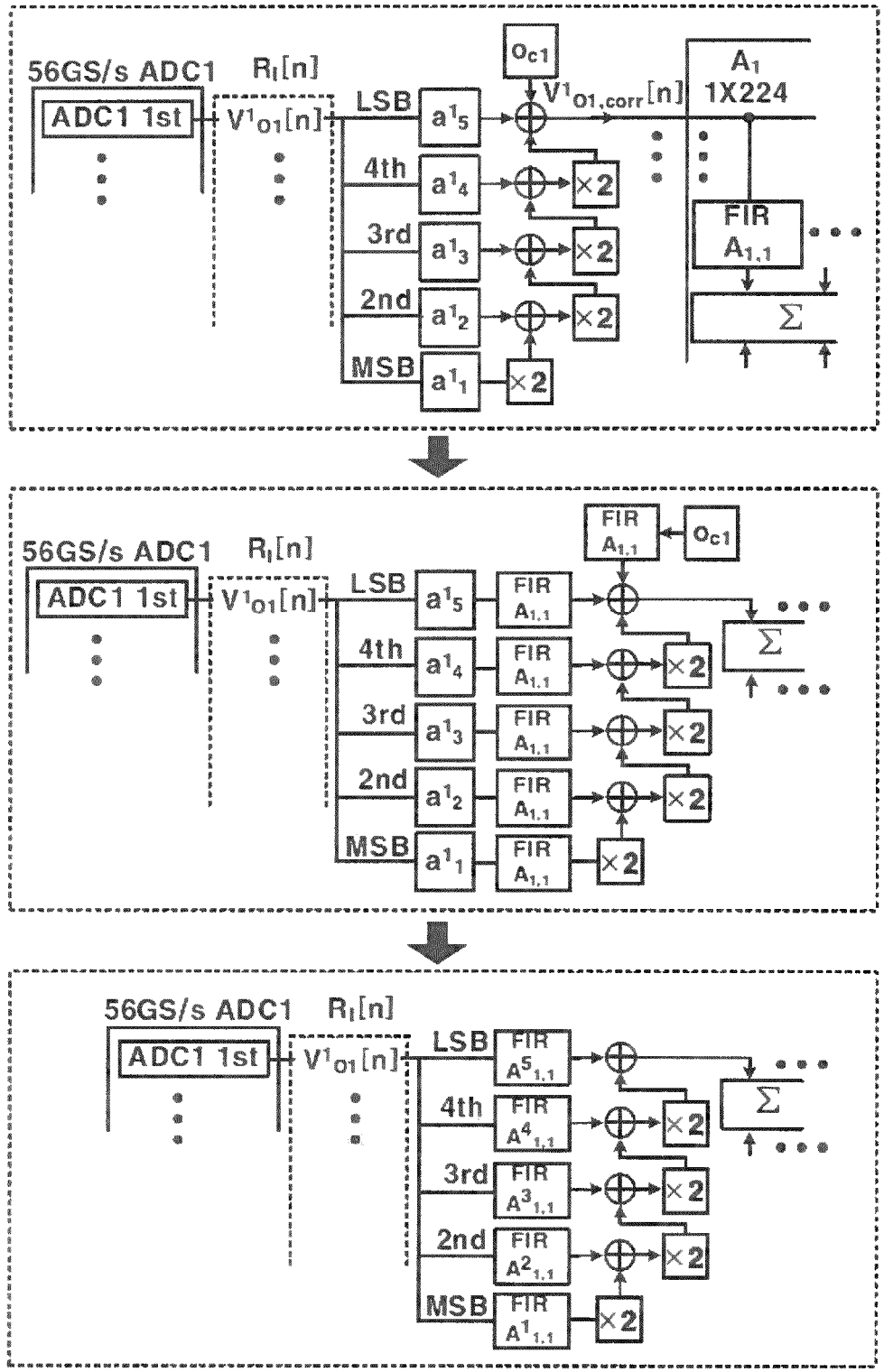
FIG. 8 shows conceptual block diagram based on merging coefficients for nonlinearity compensation with those for MIMO equalization according to an exemplary embodiment of the present invention.

The corrected output signal $V_{O,corr}$ of a five-bit SAR ADC can be written as the following Equation 32.

$$V_{O,corr} = \Sigma_{i=1}^{5} a_i \times d_i + o_c \quad \text{[Equation 32]}$$

wherein $a_i$ and $o_c$ are the coefficient and offset for the correction, respectively. The correction factors $a_i$ and $o_c$ were retrieved using a slow-but-accurate reference ADC in the earlier work. However, $a_i$ can be combined with the filter coefficients of the digital FIR filter by using a DA scheme as shown in FIG. 8, and adjusted adaptively by an LMS algorithm. FIG. 3 shows conceptual block diagram based on merging coefficients for nonlinearity compensation with those for MIMO equalization according to an exemplary embodiment of the present invention.

Figure 9:
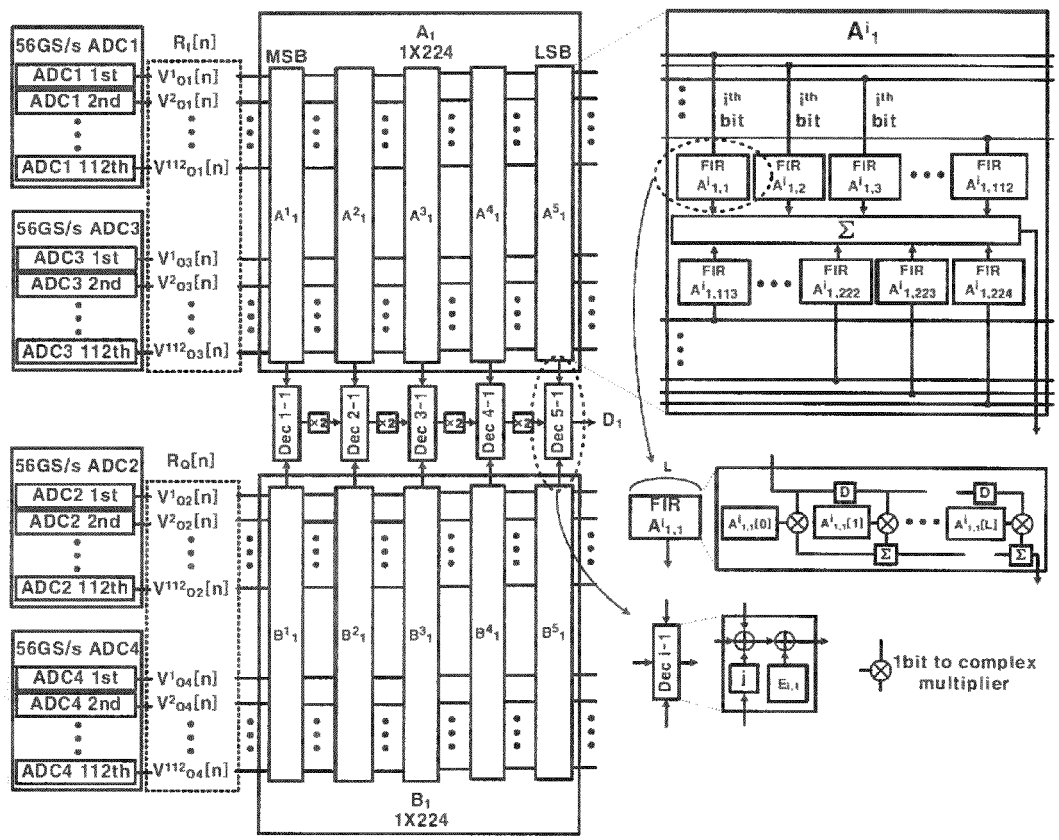
FIG. 9 shows a block diagram of a sub-equalizer of the DA MIMO equalizer according to an exemplary embodiment of the present invention.

FIG. 9 shows a block diagram of a sub-equalizer of the DA MIMO equalizer according to an exemplary embodiment of the present invention. The coefficient in the DA MIMO equalizer is related to that of the MIMO equalizer $A_{j,k}^i$ in the Equation 25 as given by the following Equation 33.

$$A_{j,k}^i = a_i^k \times A_{j,k}, i = 1 \ldots 5, j = 1 \ldots 112, \quad \text{[Equation 33]}$$

$$k = 1 \ldots 224$$

where the correction factor $a_i^k$ may satisfy the following Equation 34.

$$V_{O1,corr}^k = \Sigma_{i=1}^{5} a_i^k \times d_i^k + o_c^k,$$

$$V_{O3,corr}^k = \Sigma_{i=1}^{5} a_i^{k+112} \times d_i^{(k+112)} + o_c^{k+112} \quad \text{[Equation 34]}$$

In summary, channel dispersion and ADC nonlinearity can be compensated for simultaneously by multiplying different FIR filter coefficients $A_{j,k}^1 \ldots A_{j,k}^5$ with each ADC output bit and combining them at the output. The offset correction factor $o_c$ is implemented in the last stage of the DA MIMO equalizer by subtracting the average values of output $E_{i,j}$ from the recovered symbols. This process aligns the center of the QPSK signal space of each sub-equalizer to the origin.

Iv. A Variable-Precision Distributed Arithmetic (VPDA) MIMO Equalizer

Figure 10:
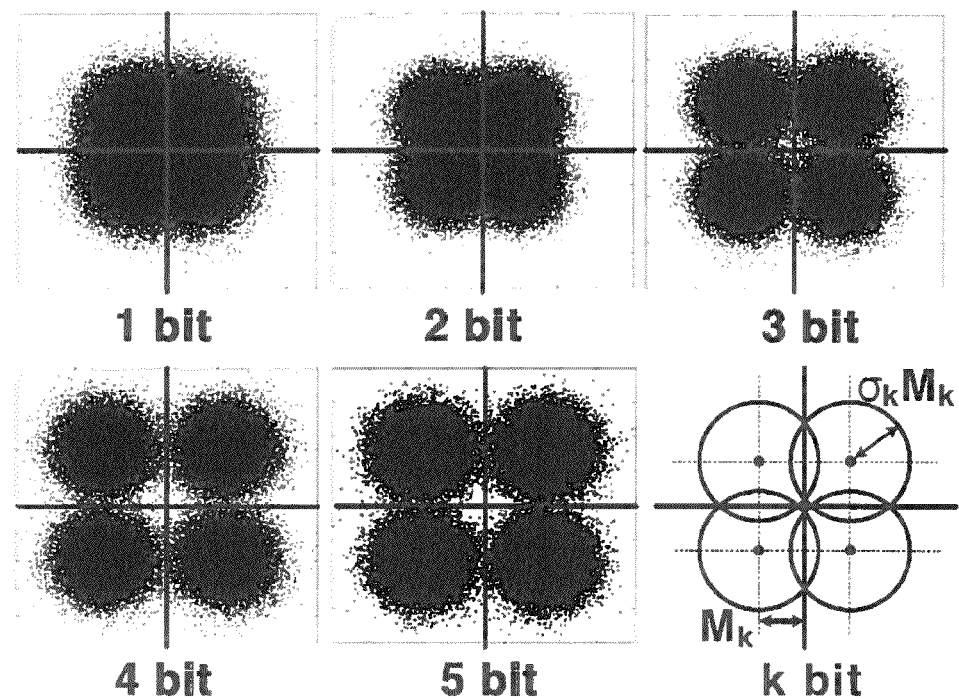
FIG. 10 shows the equalized QPSK symbols under different ADC resolutions in a two-dimensional signal space according to an exemplary embodiment of the present invention.
Figure 11:
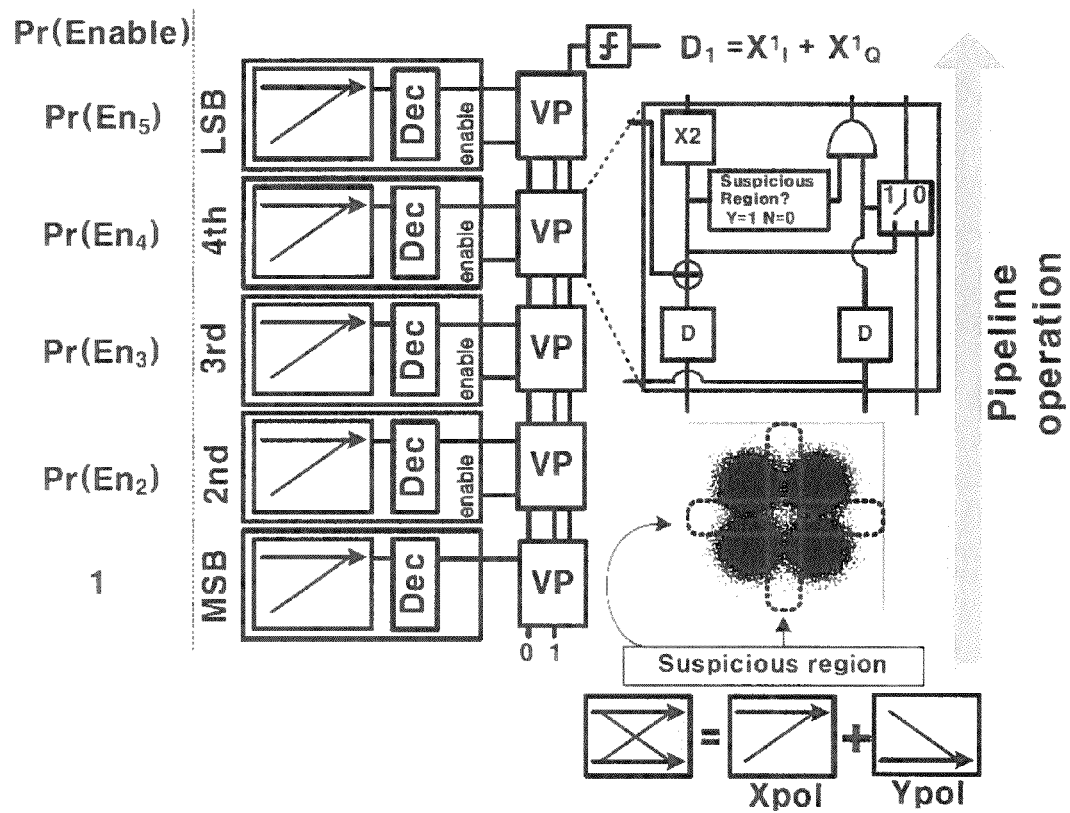
FIG. 11 shows a conceptual block diagram of the proposed variable-precision architecture embedded in the DA framework according to an exemplary embodiment of the present invention.

The VPDA MIMO equalizer reduces the dynamic power consumption of the DA MIMO equalizer by using only the minimum required resolution for the equalization of each dispersed symbol. FIG. 10 shows the equalized QPSK symbols under different ADC resolutions in a two-dimensional signal space according to an exemplary embodiment of the present invention. The magnitude of the standard deviations $\sigma_k$ and the resulting BER are inversely proportional to the resolution of the ADC. However, equalized symbols located distant from decision thresholds in the signal space can be correctly determined with high probability even under low ADC resolutions. In other words, the required resolution for the equalization of each dispersed symbol is different. FIG. 11 shows a conceptual block diagram of the proposed variable-precision architecture embedded in the DA framework according to an exemplary embodiment of the present invention. The proposed pipelined equalizer begins the computation from the most significant bit (MSB) towards the least significant bit (LSB) sequentially. Range checkers are inserted between the DA-based subequalizers described in FIG. 9 to determine whether further computation with a higher resolution is required. In case a partially equalized symbol is located outside the suspicious region in the signal space (see FIG. 11), a final decision is made and no further computations are performed. In contrast, if the partial result is within the suspicious region, the precision of the partial result is increased by one bit and the location of the equalized symbol in the signal space is rechecked. Thus, the average resolution for the equalization can be reduced significantly and hence the dynamic power consumption can also be decreased.

The estimated power ratio of the VPDA MIO equalizer over the DA MIMO equalizer may be approximately represented by the following Equation 35.

$$\frac{P_{VPDA}}{P_{DA}} \approx \sum_{k=1}^{5} \frac{1}{5} \times Pr(En_k) \qquad \text{[Equation 35]}$$

where $P_{VPDA}$ and $P_{DA}$ are the power consumptions of the VPDA MIMO and the DA MIMO equalizers, respectively, and $Pr(En_k)$ denotes the probability that a single bit equalizer at each resolution step is being enabled as shown in FIG. 11.

Figure 12:
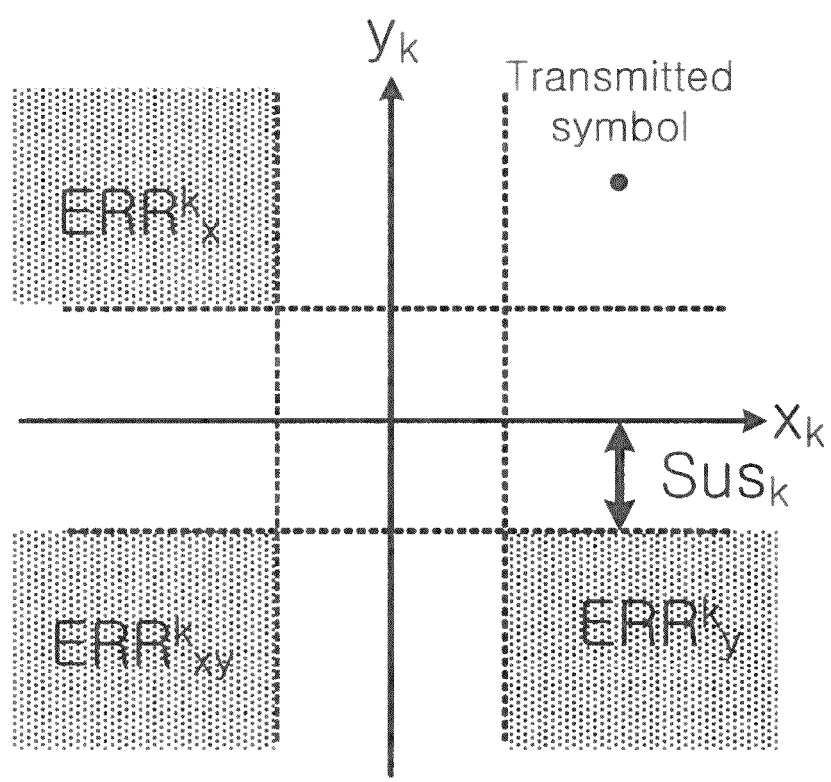
FIG. 12 shows erroneous regions in the QPSK signal space when (1, 1) is sent according to an exemplary embodiment of the present invention.

The probability $Pr(En_k)$ is determined by both SNR and the area of suspicious region at each resolution step. Proper selection of the suspicious region in the signal space is crucial for the VPDA MIMO equalizer because premature inaccurate decisions caused by insufficient area of the suspicious regions increase BER penalty. Therefore, the design target for the dynamic power minimization of the VPDA MIMO equalizer is to minimize the average ADC resolution by minimizing the area of the suspicious regions without a significant BER penalty. The transition rate, defined as the probability of an equalized symbol being in the suspicious region in the $k^{th}$ stage depends on both the size of the suspicious region in the current stage and the transition rate in the previous stages. Thus, the size of the suspicious regions should be determined sequentially from MSB to LSB. The suspicious region of the first stage, $Sus_1$, is determined based on the BER while assuming that the suspicious regions in the subsequent stage are infinite and that no extra bit-error occurs from the variable-precision architecture. The estimated BER at the output of the first stage may be represented by the following Equation 36.

$$BER = Pr(\text{bit error} \cap P_1^c) + Pr(\text{bit error} \cap P_1 \cap P_5^c) \qquad \text{[Equation 36]}$$

wherein $P_k$ denotes the set of events that the output symbol in the $k^{th}$ stage, $Sym_k = (X_k, Y_k)$, is in the suspicious region and $P_k^c$ denotes the complementary set of $P_k$. In case symbol (1, 1) is transmitted, Pr (bit error$\cap P_k^c$) can be expanded as the following Equation 37.

$$Pr(\text{bit error} \cap P_k^c) = Pr(\text{bit error} | E_k^x) \cdot Pr(E_k^x) + \qquad \text{[Equation 37]}$$
$$Pr(\text{bit error} | E_k^y) \cdot Pr(E_k^y) + Pr(\text{bit error} | E_k^{xy}) \cdot Pr(E_k^{xy})$$

wherein $E_k^x$, $E_k^y$ and $E_k^{xy}$ are the sets of erroneous events, as given by the following Equation 38.

$$E_k^x = \{Sym_k \in ERR_x^k\}$$
$$E_k^y = \{Sym_k \in ERR_y^k\}$$
$$E_k^{xy} = \{Sym_k \in ERR_{xy}^k\} \qquad \text{[Equation 38]}$$

wherein $ERR_x^k$, $ERR_y^k$ and $ERR_{xy}^k$ denote the areas shown in FIG. 12. FIG. 12 shows erroneous regions in the QFSK signal space when (1, 1) is sent according to an exemplary embodiment of the present invention. Note that the conditional probabilities in the Equation 37 are be represented by the following Equation 39.

$$Pr(\text{bit error} | E_k^x) = \frac{1}{2} \qquad \text{[Equation 39]}$$
$$Pr(\text{bit error} | E_k^y) = \frac{1}{2}$$
$$Pr(\text{bit error} | E_k^{xy}) = 1$$

Because the two-dimensional probability density function of $Sym_k$ is symmetric with respect to $Y_k = X_k$, the Equation 37 can be simplified to the following Equation 4.

$$Pr(\text{bit error} \cap P_k^c) = \frac{1}{2} \cdot Pr(E_k^x) + \frac{1}{2} \cdot Pr(E_k^y) + Pr(E_k^{xy}) \qquad \text{[Equation 40]}$$
$$= Pr(E_k^x) + Pr(E_k^{xy})$$
$$= Pr(E_k^x \cup E_k^{xy})$$

Because the noise in each equalized symbol is a linear combination of independent and identically distributed (i.i.d) additive noises caused by quantization and limited input signal-to-noise ratio in each sample, it can be assumed to show a Gaussian distribution according to the central limit theorem. Then, the probabilities $Pr(E_k^x)$ and $Pr(E_k^{xy})$ are given by the following Equation 41 and Equation 42.

$$Pr(E_k^x) = \int_{-\infty}^{-Sus_1} \int_{Sus_1}^{\infty} g(x, 1, \sigma_k) \cdot g(y, 1, \sigma_k) dx dy \qquad \text{[Equation 41]}$$
$$= Q\left(\frac{Sus_1 + 1}{\sigma_k}\right) \cdot Q\left(\frac{Sus_1 - 1}{\sigma_k}\right)$$

$$Pr(E_k^{xy}) = \int_{-\infty}^{-Sus_1} \int_{-\infty}^{-Sus_1} g(x, 1, \sigma_k) \cdot \qquad \text{[Equation 42]}$$
$$g(y, 1, \sigma_k) dx dy$$
$$= Q\left(\frac{Sus_1 + 1}{\sigma_k}\right)^2$$

wherein $\sigma_k$ is the standard deviation of the noise at $k^{th}$ stage and $g(x,\mu,\sigma)$ is a Gaussian function, as given by the following Equation 43.

$$g(x, \mu, \sigma) = \frac{1}{\sqrt{2\pi} \sigma} \cdot e^{-\frac{(x-\mu)^2}{2\sigma^2}} \qquad \text{[Equation 43]}$$

Because $P_k$ is symmetrical with respect to $Y_k = X_k$, Pr(bit error$\cap P_m \cap P_n^c$), $m \leq n$ can be written using Equation 40 as the following Equation 44.

$$Pr(\{\text{bit error} \cap P_n^c\} \cap P_m) = Pr(\{E_n^x \cup E_n^{xy}\} \cap P_m) \qquad \text{[Equation 44]}$$
$$= Pr(E_n^x \cap P_m) + Pr(E_n^{xy} \cap P_m)$$

Let $N_{m,n}$ be the noise added to the equalized output signal when ADC resolution is reduced from n bit to in bit. $N_{m,n}$ can be modeled by a Gaussian distribution of $N(0,\sqrt{\sigma_m^2 - \sigma_n^2})$. Then, $Pr(E_n^x \cap P_m)$ may be given by the following Equation 45.

$$Pr(E_n^x \cap P_m) = Pr\left(\bigcap \left\{ \begin{array}{l} \{X_n < -Sus_n\} \cap \{Sus_n < Y_n\} \\ \{-Sus_m < X_m < Sus_m\} \cup \\ \{-Sus_m < Y_m < Sus_m\} \end{array} \right\}\right) \quad \text{[Equation 45]}$$

$$= Pr\left(\bigcap \left\{ \begin{array}{l} \{X_n < -Sus_n\} \cap \{Sus_n < Y_n\} \\ \left\{ \begin{array}{l} -Sus_m < N_{m,n}^x + \\ X_n < Sus_m \end{array} \right\} \\ \cup \left\{ \begin{array}{l} -Sus_m < N_{m,n}^y + \\ Y_n < Sus_m \end{array} \right\} \end{array} \right\}\right)$$

$$= Pr\left(\bigcap \left\{ \begin{array}{l} \{X_n < -Sus_n\} \cap \{Sus_n < Y_n\} \\ \left\{ \begin{array}{l} -Sus_m - X_n < \\ N_{m,n}^x < Sus_m - X_n \end{array} \right\} \\ \cup \left\{ \begin{array}{l} -Sus_m - Y_n < \\ N_{m,n}^y < Sus_m - Y_n \end{array} \right\} \end{array} \right\}\right)$$

The Equation 45 is changed to the following Equation 46.

$$Pr(E_n^x \cap P_m) = Pr\left( \begin{array}{l} \{X_n < -Sus_n\} \cap \{Sus_n < Y_n\} \cap \\ \{-Sus_m - X_n < N_{m,n}^x < Sus_m - X_n\} \end{array} \right) + \quad \text{[Equation 46]}$$

$$Pr\left( \begin{array}{l} \{X_n < -Sus_n\} \cap \{Sus_n < Y_n\} \cap \\ \{-Sus_m - Y_n < N_{m,n}^y < Sus_m - Y_n\} \end{array} \right) -$$

$$Pr\left( \begin{array}{l} \{|X_n < -Sus_n\} \cap \{Sus_n < Y_n\} \cap \\ \{-Sus_m - X_n < N_{m,n}^x < Sus_m - X_n\} \\ \cap \{-Sus_m - Y_n < N_{m,n}^y < Sus_m - Y_n\} \end{array} \right)$$

Similarly, $Pr(E_n^{xy} \cap P_m)$ may be represented by the following Equation 47.

$$Pr(E_n^{xy} \cap P_m) = Pr\left( \begin{array}{l} \{X_n < -Sus_n\} \cap \{Y_n < -Sus_n\} \cap \\ \{-Sus_m - X_n < N_{m,n}^x < Sus_m - X_n\} \end{array} \right) + \quad \text{[Equation 47]}$$

$$Pr\left( \begin{array}{l} \{X_m < -Sus_n\} \cap \{Y_n < -Sus_n\} \cap \\ \{-Sus_m - Y_n < N_{m,n}^y < Sus_m - Y_n\} \end{array} \right) -$$

$$Pr\left( \begin{array}{l} \{X_n < -Sus_n\} \cap \{Y_n < -Sus_n\} \cap \\ \{-Sus_m - X_n < N_{m,n}^x < Sus_m - X_n\} \\ \cap \{-Sus_m - Y_n < N_{m,n}^y < Sus_m - Y_n\} \end{array} \right)$$

Assuming that the random variables $X_n$, $Y_n$, $N_{m,n}^x$ and $N_{m,n}^y$ are independent, Equation 45 becomes the following Equation 48.

$$Pr(E_n^x \cap P_m) = \int_{-\infty}^{-Sus_n} F_{m,n}(x_n) dx_n \cdot Q\left(\frac{-1+Sus_n}{\sigma_n}\right) + \quad \text{[Equation 48]}$$

$$\int_{Sus_{u1}}^{\infty} F_{m,n}(y_n) dy_n \cdot Q\left(\frac{1+Sus_n}{\sigma_n}\right) -$$

$$\int_{-\infty}^{-Sus_n} F_{m,n}(x_n) dx_n \cdot \int_{Sus_n}^{\infty} F_{m,n}(y_n) dy_n$$

wherein $F_{m,n}(x)$ may be defined in the following Equation 49.

$$F_{m,n}(x) = \left( Q\left(\frac{-Sus_m - x}{\sqrt{\sigma_m^2 - \sigma_n^2}}\right) - Q\left(\frac{Sus_m - x}{\sqrt{\sigma_m^2 - \sigma_n^2}}\right) \right) \cdot g(x, 1, \sigma_n) \quad \text{[Equation 49]}$$

Similarly, $Pr(E_n^{xy} \cap P_m)$ may be given by the following Equation 50.

$$Pr(E_n^{xy} \cap P_m) = \int_{-\infty}^{-Sus_n} F_{m,n}(x_n) dx_n \cdot Q\left(\frac{1+Sus_n}{\sigma_n}\right) + \quad \text{[Equation 50]}$$

$$\int_{-\infty}^{-Sus_n} F_{m,n}(y_n) dy_n \cdot Q\left(\frac{1+Sus_n}{\sigma_n}\right) -$$

$$\int_{-\infty}^{-Sus_n} F_{m,n}(x_n) dx_n \cdot \int_{-\infty}^{-Sus_n} F_{m,n}(y_n) dy_n =$$

$$2 \cdot \int_{-\infty}^{-Sus_n} F_{m,n}(x_n) dx_n \cdot Q\left(\frac{1+Sus_n}{\sigma_n}\right) +$$

$$\left( \int_{-\infty}^{-Sus_n} F_{m,n}(x_n) dx_n \right)^2$$

The addition of the Equation 48 and the Equation 50 renders the conditional probability of $Pr(\{\text{bit error} \cap P_n^c\} \cap P_m)$. Then, the relationship between $Sus_1$ and BER can be achieved from (36) and the minimum $Sus_1$ satisfying a BER target can be chosen. The relationship between BER and $Sus_2$ with the minimum $Sus_1$ value chosen above may be the following Equation 51.

$$BER = Pr(\text{bit error} \cap P_1^c) + \quad \text{[Equation 51]}$$

$$Pr(\text{bit error} \cap P_1 \cap P_2^c) + Pr(\text{bit error} \cap P_1 \cap P_2 \cap P_5^c)$$

$Pr(\text{bit error} \cap P_1 \cap P_2 \cap P_5^c)$ can be simplified to $Pr(\text{bit error} \cap P_2 \cap P_5^c)$ given that $Sus_2$ is smaller than $Sus_1$; thus, $P_1 \cap P_2 \approx P_2$. In general, the relationship between BER and $Sus_k$ with a predetermined minimum $Sus_1 \ldots Sus_{k-1}$ may be given by the following Equation 52.

$$BER = Pr(\text{bit error} \cap P_1^c) + \sum_{i=2}^{k} Pr(\text{bit error} \cap P_{i-1} \cap P_i^c) + \quad \text{[Equation 52]}$$

$$Pr(\text{bit error} \cap P_k \cap P_5^c)$$

$$k = 2, 3, 4$$

provided that the following Equation 53.

$$Pr(P_1 \cap P_2 \ldots P_k) \approx Pr(P_k) \quad \text{[Equation 53]}$$

wherein $Pr(P_k)$ is derived in the following Equation 54. Finally, the dynamic power reduction ratio of the VPDA MIMO equalizer can be estimated by using the Equation 35 because $Pr(P_k) = Pr(En_{k+1})$.

$$Pr(P_k) = Pr\begin{pmatrix} \{-Sus_k < X_k < Sus_k\} \cup \\ \{-Sus_k < Y_k < Sus_k\} \end{pmatrix}$$ [Equation 54]
$$= Pr(\{-Sus_k < X_k < Sus_k\}) +$$
$$Pr(\{-Sus_k < Y_k < Sus_k\}) -$$
$$Pr(\{-Sus_k < X_k < Sus_k\} \cap \{-Sus_k < Y_k < Sus_k\}$$
$$= 2 \cdot \left(Q\left(\frac{-1-Sus_k}{\sigma_k}\right) - Q\left(\frac{-1+Sus_k}{\sigma_k}\right)\right) -$$
$$\left(Q\left(\frac{-1-Sus_k}{\sigma_k}\right) - Q\left(\frac{-1+Sus_k}{\sigma_k}\right)\right)^2$$
$$k = 1 \ldots 4$$
$$Pr(P_5) = 0$$

V. Simulation

Figure 13:
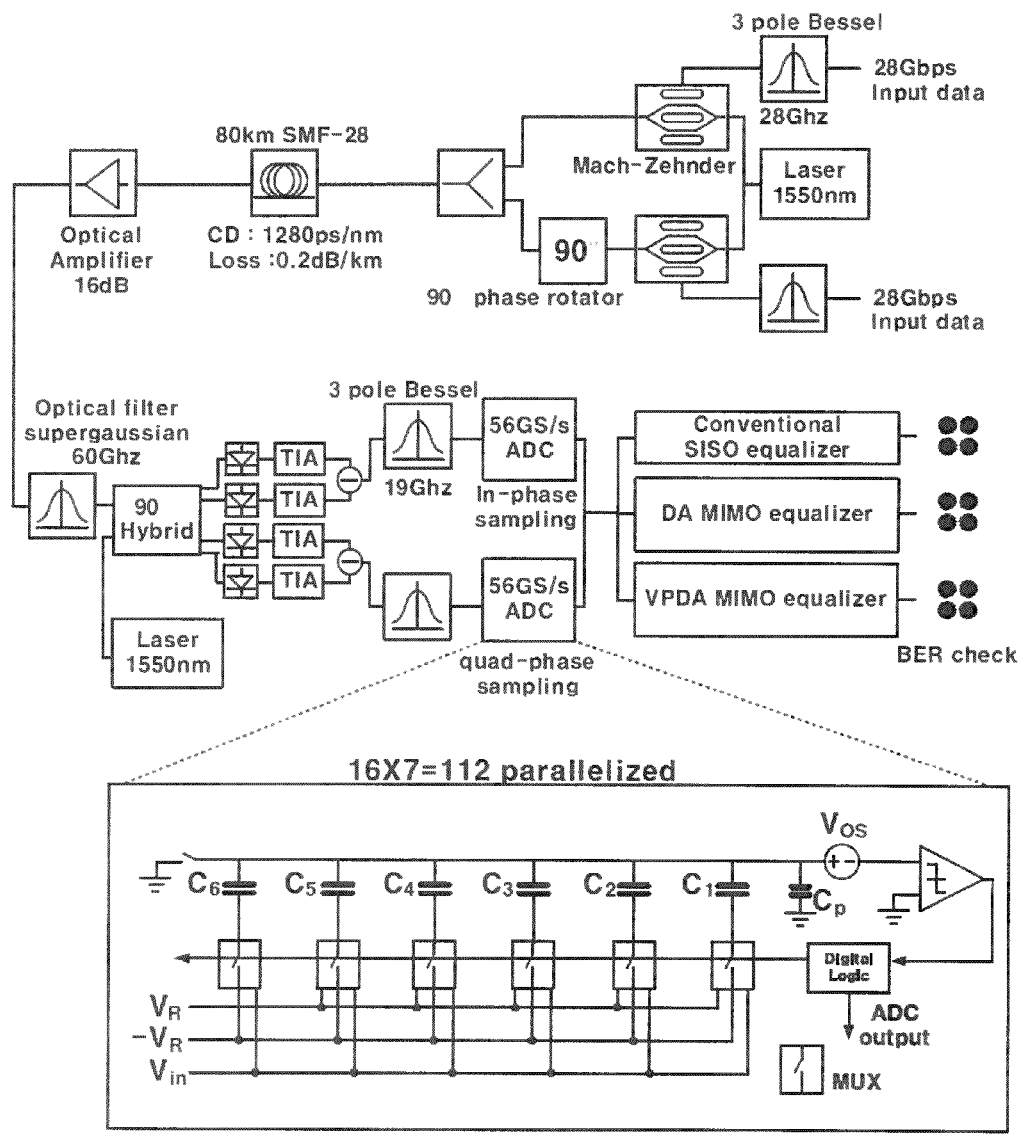
FIG. 13 shows a simulation setup of the VPDA MIMO equalizer according to an exemplary embodiment of the present invention.
Figure 14:
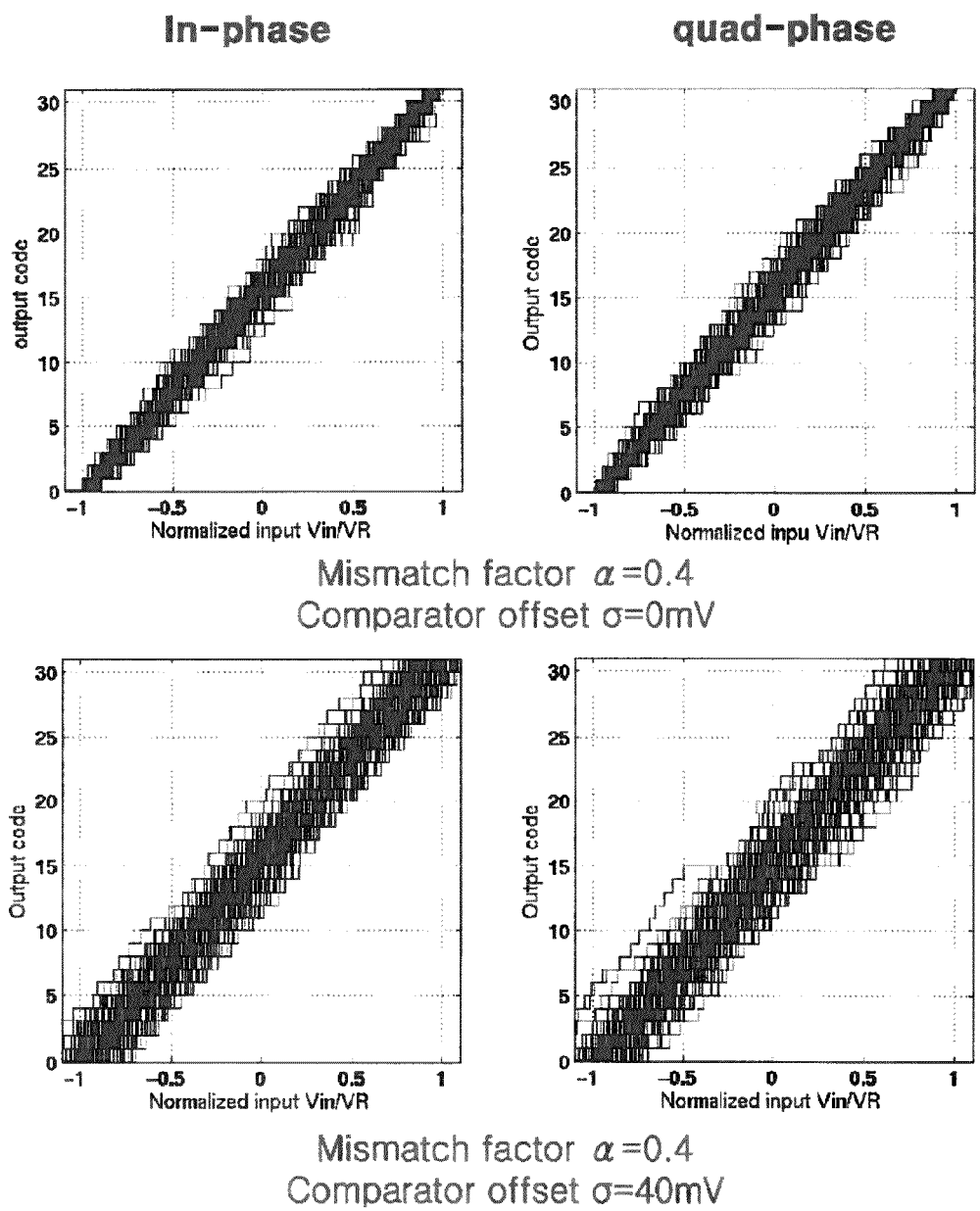
FIG. 14 shows randomly generated total 224 nonlinear characteristics of the SAR ADCs according to an exemplary embodiment of the present invention.
Figure 15:
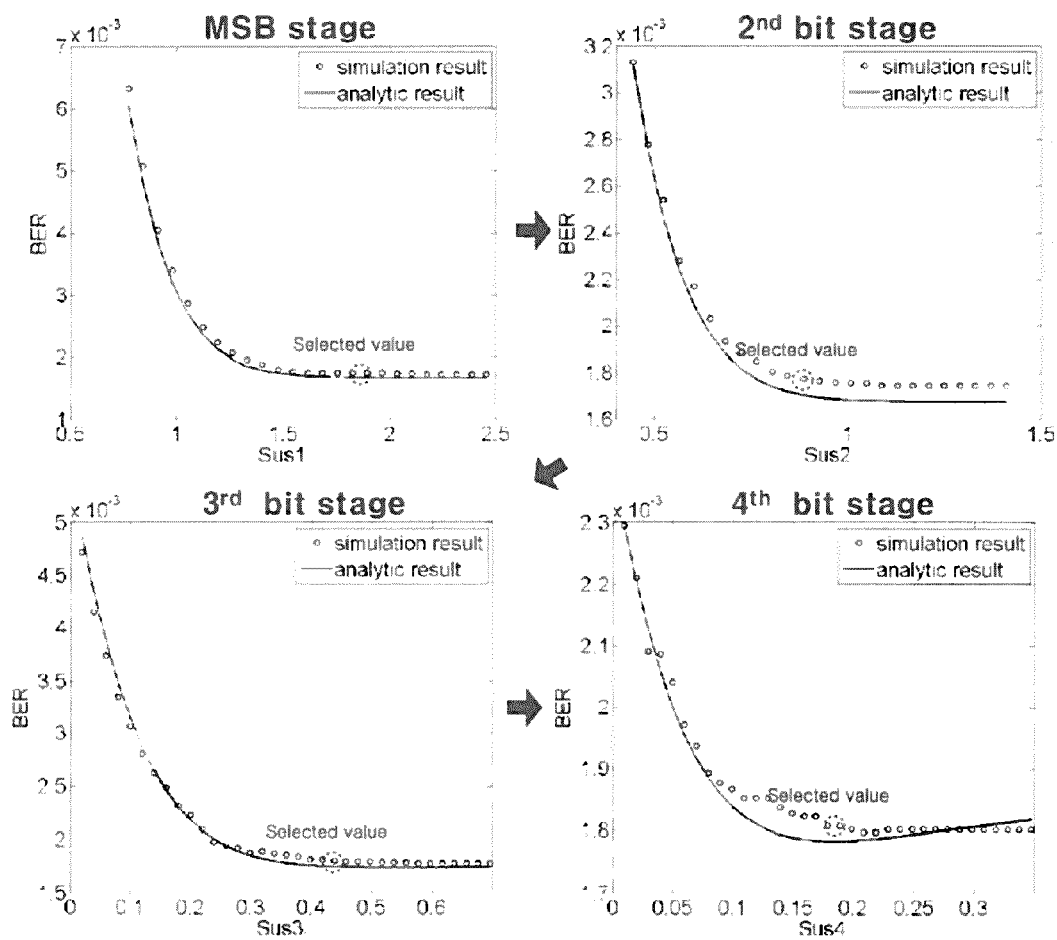
FIG. 15 shows BER increment with respect to the size of the suspicious regions for each stage according to an exemplary embodiment of the present invention.

The simulation setup of the VPDA MIMO equalizer is shown in FIG. 13. The channel and optical components are modeled using OPTSIM and the equalizer is simulated using MATLAB. Chromatic dispersion up to 1360 ps/nm, equivalent to 801 cm in SMF-28 single mode fiber at a wavelength of 1550 nm, without PMD is considered as the channel impairment. Hence, 56 Gbps OPSK data transmitted through a single polarization is used for the verification of the proposed VPDA MIMO architecture for simplicity. The bandwidth of the optical filter at the receiver is set to 60 GHz and third-order Bessel filters with a bandwidth of 19 GHz are used. 201322 randomly generated bits are used for the BER simulation, where the BER target is 10'. The data sampled by the two nonlinear 56 GS/s ADCs is fed into a conventional equalizer, a DA MIMO equalizer and a VPDA MIMO equalizer for comparison. The coefficients of each equalizer are adapted using an LMS algorithm. A total of 16×7×2=224 different nonlinear characteristics of SAR ADCs are randomly generated for two 56 GS/s ADCs by randomizing the capacitance mismatches and comparator offsets. The standard deviations of the capacitances are set proportional to $\sqrt{area}$ as given by the following Equation 55.

$$\sigma_{C_k} = \alpha \times \sqrt{2^{5-k}} \times C_6$$

$$C_k = 2^{5-k} \times C_6, k = 1 \ldots 5$$

$$C_5 = C_6$$

wherein α is a process parameter. In this simulation α is set to 0.4. The standard deviation of the comparator offset is set to 40 mV and the full scale of the ADC is set to ±400 mV$_{peak-peak}$. Total 112 randomly generated nonlinear characteristics of a single ADC are shown in FIG. 14. The gain and sampling phase mismatches between 16 track and hold circuits are randomly generated with standard deviations of 0.2V/V and 4 ps(0.22 UI), respectively. The precisions of the coefficients of the DA and VPDA MIMO FIR equalizers are set to 8 bit in order to suppress the penalty due to the finite precision below 0:1 dB at a BER of $10^{-3}$. The simulated values of $\sigma_k$ in FIG. 10 for the different ADC resolutions are summarized in the following Table. 2. The relationships between BER and the range of the suspicious regions for each VPDA MIME stage from the Equation 52 are plotted as solid lines in FIG. 15. FIG. 15 shows BER increment with respect to the size of the suspicious regions for each stage according to an exemplary embodiment of the present invention. The hollow circle markers in the figure denote the simulated BER points.

TABLE 2

| resolution | 1-bit | 2-bit | 3-bit | 4-bit | 5-bit |
|---|---|---|---|---|---|
| $\sigma_k$ | 0.7262 | 0.5045 | 0.3931 | 0.3534 | 0.3407 |

The analytic results (lines) discussed in section IV closely match the simulation results (hollow circle). The normalized suspicious regions with respect to the QPSK signal space for each level of ADC precision from MSB to LSB are set to 1.82, 0.86, 0.44 and 0.19 as shown in FIG. 15 considering the BER penalty. The following Table 3 summarizes the analytical and simulated enable rate of the equalizer at each resolution step with the suspicious regions selected in the above.

TABLE 3

| | Pr(En$_k$) | Pr(En$_2$) | Pr(En$_3$) | Pr(En$_4$) | Pr(En$_5$) |
|---|---|---|---|---|---|
| Eq.(54) | 0.983 | 0.625 | 0.147 | 0.021 | |
| simulation | 0.985 | 0.624 | 0.143 | 0.020 | |

Figure 16:
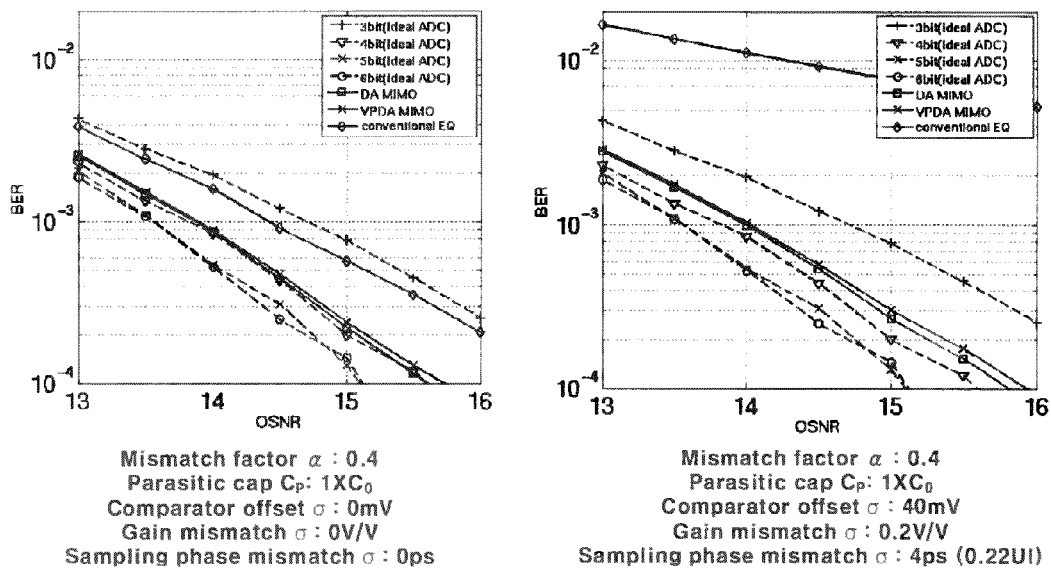
FIG. 16 shows the simulated OSNR vs. BER graphs for three different equalizers according to an exemplary embodiment of the present invention.
Figure 17:
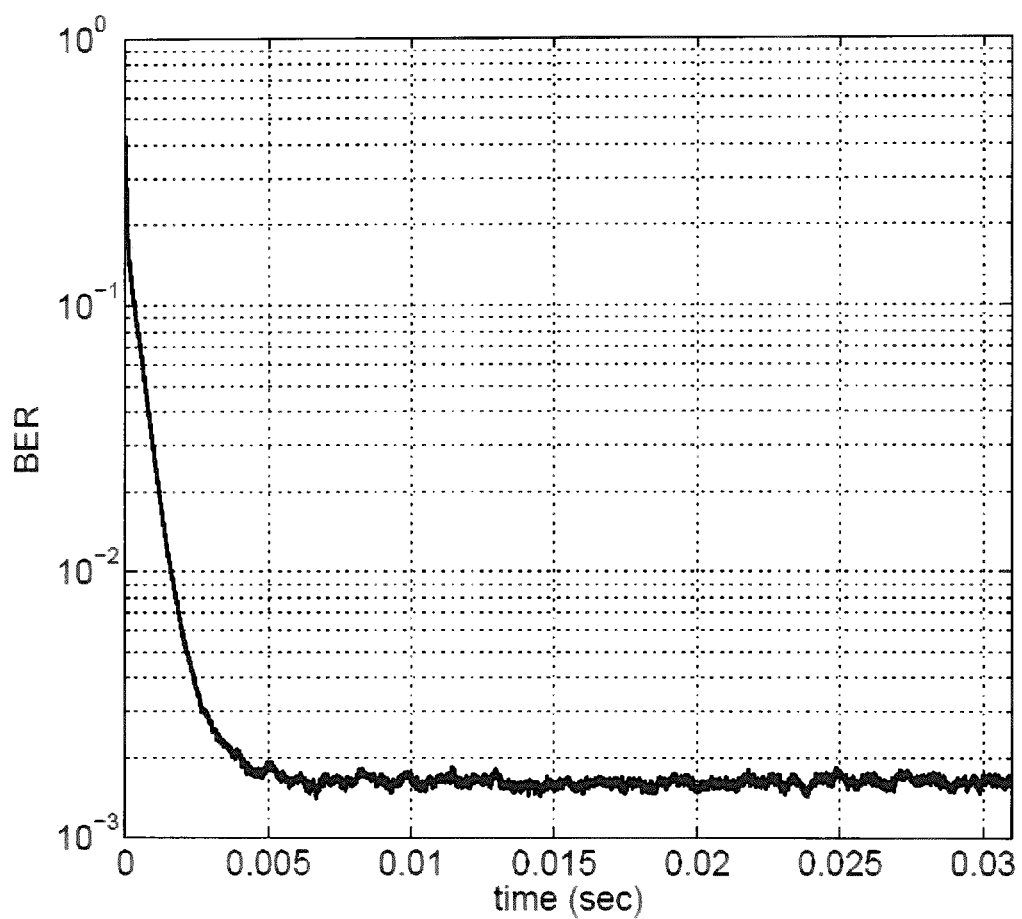
FIG. 17 shows the simulated tracking performance of the VPDA MIMO equalizer under the rotation of the polarization plane at a rate of 50 rad/s according to an exemplary embodiment of the present invention.

The estimated dynamic power ratio of the proposed VPDA MIMO equalizer over the DA MIMO equalizer is 0.55 from the Equation 35 and thus 45% of dynamic power consumption can be reduced. FIG. 16 shows the simulated OSNR vs. BER graphs for three different equalizers according to an exemplary embodiment of the present invention. The VPDA MIMO equalizer with the dynamic power reduction of 45% shows a negligible OSNR penalty compared to the DA MIMO equalizer. The VPDA MIMO equalizer subsequent to the non-ideal ADCs shows a 0.5 dB worst-case OSNR penalty compared to the ideal five bit ADCs followed by an ideal equalizer at a BER of $10^{-3}$. In contrast, the conventional equalizer with an identical nonideal ADCs shows an OSNR penalty of more than 2.5 dB at a BER of $10^{-3}$. The adaptation speed of the VPDA MIMO equalizer is 56 times slower than that of a conventional parallel equalizer because one adaptation engine sequentially sets the coefficients of 56 parallel sub-equalizers. FIG. 17 shows the simulated tracking performance, of the VPDA MIMO equalizer under the rotation of the polarization plane at a rate of 50 rad/s according to an exemplary embodiment of the present invention. Such a rotational rate is considered severe in 80 km applications. Variable precision scheme is disabled for simplicity. SNR is set to 13.5 dB and the initial coefficients of the VPDA MIMO equalizer are set to 0. The clock frequency is 500 MHz and the BER is measured every 3.6 us. The estimated time constant of the adaptation engine is less than 2 ms and the VPDA MIMO equalizer demonstrates negligible BER penalty.

VI. Summary

A power-and-area efficient BER-aware VDPA MIMO architecture for a 112 Gb/s DP-QPSK coherent receiver is presented. The VPDA MEMO equalizer achieves 45% dynamic power reduction compared to conventional FIR equalizers and does not require area-hungry analog domain calibration circuits for the ADC.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A variable-precision distributed arithmetic (VPDA) multi-input multi-output (MIMO) equalizer connected to outputs of a plurality of analog-to-digital converters (ADCs) based on time-interleaved successive approximation registers, the VPDA MIMO equalizer comprising:
  a plurality of sub-equalizers classified into a first sub-equalizers group and a second sub-equalizers group, wherein each of a plurality of sub-equalizers included in the first sub-equalizers group is connected to outputs of a first ADC group and each of a plurality of sub-equalizers included in the second sub-equalizers group is connected to outputs of a second ADC group; and
  a decision unit configured to determine recovered data using an output symbol of the plurality of sub-equalizers,
  wherein one sub-equalizer included in the first sub-equalizers group relates to other one sub-equalizer included in the second sub-equalizers group, and the recovered data is determined by the decision unit based on outputs of the one sub-equalizer and the other one sub-equalizer,
  wherein each of the plurality of sub-equalizers comprises a plurality of additional-equalizers for distributed arithmetic, and each of the additional-equalizers corresponds to one of bits according to a resolution of the ADCs.

2. The VPDA MIMO equalizer of claim 1, wherein one additional-equalizer of the one sub-equalizer relates to other one additional-equalizer of the other one sub-equalizer, and the one output symbol is determined by the decision unit based on an output of the one additional-equalizer and an output of the other one additional-equalizer.

3. The VPDA MIMO equalizer of claim 1, wherein outputs of the ADCs corresponding to i-th bit of the bits is inputted to i-th additional-equalizers of the plurality of sub-equalizers.

4. The VPDA MIMO equalizer of claim 1, wherein each of the plurality of additional-equalizers comprises a plurality of finite impulse responses (FIR) filters.

5. The VPDA MIMO equalizer of claim 4, wherein one part of the plurality of FIR filters is connected to outputs of one ADC of the first ADC group (or the second ADC group), and another part of the plurality of FIR filters is connected to outputs of other one ADC of the first ADC group (or the second ADC group).

6. The VPDA MIMO equalizer of claim 1, wherein the plurality of additional-equalizers is configured to repeatedly compute an equalized symbol for a resolution sequentially increasing by a determination of a range checker according to a sequence from the most significant bit (MSB) of the bits towards the least significant bit (LSB) of the bits.

7. The VPDA MIMO equalizer of claim 6, further comprising:
  the range checker is configured to determine whether a higher resolution than a present is required based on a value of the equalized symbol of the present resolution.

8. The VPDA MIMO equalizer of claim 1, wherein coefficients with each of bits according to a resolution of the ADCs are combined with filter coefficients of FIR filters by at least one of a distributed arithmetic (DA) scheme and a least mean square (LMS) algorithm.

9. The VPDA MIMO equalizer of claim 8, wherein each of outputs of the ADCs is multiplied with the combined coefficients and each of outputs of the FIR filters is combined.

10. A variable-precision (VP) equalizer comprising:
  a plurality of additional-equalizers, configured to repeatedly compute an equalized symbol for a resolution sequentially increasing by a determination of a range checker according to a sequence from the most significant bit (MSB) towards the least significant bit (LSB) of bits of a digital value;
  a decision unit configured to determine recovered data using the equalized symbol of the plurality of additional-equalizers; and
  the range checker configured to determine whether a higher resolution than a present resolution is required based on a value of the equalized symbol for the present resolution.

11. The VP equalizer of claim 10, wherein the digital value is a coefficient for the equalization and i-th resolution bits of the digital value are connected to i-th additional-equalizers.

12. The VP equalizer of claim 10, wherein the digital value is an output of an analog-to-digital converter (ADC) and i-th resolution bits of outputs of the ADC are inputted to i-th additional-equalizers.

13. A receiver comprising:
  an analog-to-digital converter (ADC); and
  a variable-precision (VP) equalizer connected to an output of the ADC, the VP equalizer comprising:
  a plurality of additional-equalizers configured to repeatedly compute an equalizer symbol for a resolution sequentially increasing by a determination of a range checker according to a sequence from the most significant bit (MSB) towards the least significant bit (LSB) of bits of a digital value;
  a decision unit configured to determine recovered data using the equalized symbol of the plurality of additional-equalizers; and
  the range checker configured to determine whether a higher resolution than a present resolution is required based on a value of the equalized symbol for the present resolution.

14. The receiver of claim 13, wherein the digital value is a coefficient for the equalization and i-th resolution bits of the digital value are connected to i-th additional-equalizers.

15. The receiver of claim 13, wherein the digital value is an output of the ADC and i-th resolution bits of outputs of the ADC are inputted to i-th additional-equalizers.

16. A distributed-arithmetic (DA) equalizer comprising:
  a plurality of additional-equalizers, each of the additional-equalizers being connected to different coefficients corresponding to one of bits according to a resolution of an analog-to-digital converter (ADC) based on successive approximation registers (SAR), wherein each of the additional-equalizers is configured to compute an equalized symbol for the resolution according to a sequence, wherein the resolution is sequentially increasing by a determination of range checker, and wherein the sequence is from the most significant bit (MSB) towards the least significant bit (LSB) of the bits of the SAR ADC;
  a decision unit configured to determine recovered data using a sum of the equalized symbols of the plurality of additional-equalizers; and
  the range checker configured to determine whether a higher resolution than a present resolution is required based on a value of the equalized symbol for the present resolution.

* * * * *